Patented June 22, 1948

2,443,666

UNITED STATES PATENT OFFICE 2,443,666

PROCESS FOR PRODUCTION OF DYESTUFF COMPRISING CONDENSING 4-SULFO-2-NITRO-CHLORBENZENE WITH A PARA-SUBSTITUTED AMINE

George W. Seymour and Victor S. Salvin, Cumberland, Md., assignors to Celanese Corporation of America, a corporation of Delaware No Drawing. Application June 21, 1945, Serial No. 600,842

4 Claims. (Cl. 260—508)

This invention relates to the preparation of acid dyestuffs and relates more particularly to the preparation of acid dyestuffs especially suitable for the dyeing of cellulose acetate or other organic derivative of cellulose materials.

An object of this invention is to provide an improved process for the preparation of acid dyestuffs suitable for coloring cellulose acetate or other organic derivative of cellulose textile materials in yellow shades extremely fast to light and acid fading, and dischargeable with the usual discharge agents to yield a clear, white discharge pattern.

Another object of this invention is the dyeing of cellulose acetate or other organic derivative of cellulose materials by solvent dyeing processes employing said acid dyestuffs.

Other objects of this invention will appear from the following detailed description.

While dyestuffs for the dyeing of cellulose acetate or other organic derivative of cellulose materials are available in a complete range of shades, certain shades which are available are not sufficiently fast to one or another of the various agencies tending to effect undesirable changes in shade to be entirely satisfactory. Some dyestuffs are prone to acid fading while others are not entirely fast to light. This lack of fastness to light is apparent in certain commercially available acid dyestuffs which are employed for dyeing cellulose acetate or other organic derivative of cellulose materials in valuable yellow shades. On exposure to sunlight or light from any other source containing rays in the ultraviolet portion of the spectrum, the yellow acid colors fade, undergoing a change in shade. In addition, certain of these yellow acid dyes do not possess a sufficient degree of solubility to enable them to be employed satisfactorily in connection with solvent dyeing operations.

The solvent method of dyeing cellulose acetate or other organic derivative of cellulose textile materials has been found to be extremely successful. This method involves the formation of a solution of the dyestuff in a volatile organic solvent and the application of the solvent dyebath formed to the cellulose acetate or other organic derivative of cellulose textile material by mechanical impregnation methods.

The diphenyl amine dyestuffs of the following general formula:

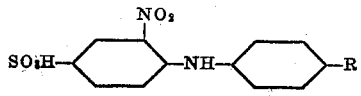

wherein R is an alkyl group such as, for example, a methyl, ethyl, propyl, isopropyl, butyl, amyl, hexyl, decyl or dodecyl group, form a class of acid dyestuffs which are not only capable of dyeing cellulose acetate or other organic derivative of cellulose materials in valuable yellow shades exhibiting an unusual degree of light fastness, but, in addition, possess the necessary solubility characteristics for satisfactory application of said dyestuffs by solvent dyeing operations. These dyestuffs have been prepared by condensing 4-sulfo-2-nitro-chlorbenzene in the form of the toluidine or other aryl-amine salt with the desired para-alkyl-substituted aniline in aqueous solution and the diphenyl amine dyestuff produced is then recovered in the form of the amine salt. This method of preparing said acid dyes is involved and highly uneconomical since it requires the use of excessive quantities of p-toluidine or other aryl amine to effect the desired reaction.

We have now found that the condensation of 4-sulfo-2-nitro-chlorbenzene with p-toluidine or other para-alkyl substituted amine may be carried out rapidly and economically in aqueous solution under alkaline conditions employing magnesium oxide or calcium oxide suspended therein to maintain the desired alkaline conditions. By our novel condensation process excellent yields of over 80% of theory may be obtained. Preferably, the condensation is effected by reacting from 1.5 to 2 mols of the para-alkyl substituted aniline with each mol of 4-sulfo-2-nitro-chlorbenzene employed at a temperature of 90 to 100° C., the reactants being refluxed for 12 to 16 hours in 4000 to 6000 parts by weight of water containing from 2 to 3 mols of magnesium oxide or calcium oxide suspended therein to maintain the desired alkaline conditions. At the completion of the condensation the reaction mixture is filtered hot to remove the suspended magnesium oxide, after which the unreacted amine is steam distilled off and the dyestuff formed is salted out of solution by the addition of sodium chloride thereto. The precipitated dyestuff may then be filtered off, washed and dried and the filtrate may then be treated to obtain an additional yield of dyestuff.

The yellow dyestuffs obtained in accordance with our improved process are not only exceedingly fast to light, as stated, but are, in addition, highly resistant to washing and acid fading. An outstanding and valuable characteristic of these dyestuffs is the fact that they are completely dischargeable, yielding clear white discharges with the usual discharging agents such as, for example, sodium formaldehyde sulfoxylate and zinc formaldehyde sulfoxylate. The discharged areas retain their original whiteness and do not become discolored even after extended service.

In order further to illustrate our invention, but without being limited thereto, the following example is given:

*Example*

48 parts by weight (0.2 mol) of 4-sulfo-2-nitrochlorbenzene and 43 parts by weight (0.4 mol) of para-toluidine are added to 2000 parts by weight of water containing 20 parts by weight (0.5 mol) of magnesium oxide in suspension. The reaction mixture is refluxed at 95° C. for 12 hours with agitation. The solution becomes deep yellow in color as the condensation reaction proceeds. The reaction mixture is filtered hot to remove the suspended magnesium oxide. The yellow filtrate is then steam distilled to remove unreacted para-toluidine. 150 parts by weight of sodium chloride are added to the residue and the mixed sodium and magnesium salts of 4-sulfo-2-nitro-4'-methyl-diphenylamine precipitate out. The precipitate is filtered off after cooling and then washed with 200 parts by weight of a 10% sodium chloride solution at 20° C. A yield of 52 parts by weight of the dyestuff, about 84% of theoretical, is obtained. An additional yield may be obtained by further treatment of the filtrate.

Cellulose acetate materials dyed with 4-sulfo-2-nitro-4'methyl-diphenylamine from a solvent dyebath comprising an aqueous solution containing 70% by weight of ethyl alcohol by padding operations are dyed in attractive yellow shades and excellent color value is obtained. Substantially no change in shade is observed on subjecting the dyed materials to the standard A. A. T. C. C. acid fading and light fastness tests for 40 and 50 hours, respectively. The dyed fabric discharges to a clear, permanent white with sodium formaldehyde sulfoxylate.

While we have described the application of these dyestuffs more particularly in connection with cellulose acetate materials, the dyestuffs may also be employed for the dyeing of other organic acid esters of cellulose, such as, for example, cellulose propionate, cellulose butyrate, cellulose acetate-propionate and cellulose acetate-butyrate as well as cellulose ethers, such as ethyl cellulose and benzyl cellulose. The dyestuffs may also be employed for the dyeing of other textile materials, such as, for example, nylon and wool.

It is to be understood that the foregoing detailed description is given merely by way of illustration and that many variations may be made therein without departing from the spirit of our invention.

Having described our invention, what we desire to secure by Letters Patent is:

1. Process for the production of dyestuffs dyeing in valuable yellow shades, which comprises condensing at 90 to 100° C. in an aqueous medium and under alkaline conditions, one mol of 4-sulfo-2-nitro-chlorbenzene with from 1.5 to 2 mols of a para-substituted amine of the following formula:

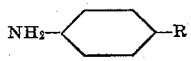

wherein R is an alkyl group, the alkaline conditions being produced in said aqueous medium by maintaining a member of the group consisting of magnesium oxide and calcium oxide suspended therein.

2. Process for the production of a dyestuff dyeing in valuable yellow shades, which comprises condensing at 90 to 100° C. in an aqueous medium and under alkaline conditions, one mol of 4-sulfo-2-nitro-chlorbenzene with from 1.5 to 2 mols of a para-substituted amine of the following formula:

the alkaline conditions being produced by maintaining magnesium oxide suspended therein.

3. Process for the production of a dyestuff dyeing in valuable yellow shades, which comprises condensing at 90 to 100° C. in an aqueous medium and under alkaline conditions, one mol of 4-sulfo-2-nitro-chlorbenzine with from 1.5 to 2 mols of a para-substituted amine of the following formula:

the alkaline conditions being produced by maintaining magnesium oxide suspended therein.

4. Process for the production of a dyestuff dyeing in valuable yellow shades, which comprises condensing at 90 to 100° C. in an aqueous medium and under alkaline conditions, one mol of 4-sulfo-2-nitro-chlorbenzene with from 1.5 to 2 mols of a para-substituted amine of the following formula:

the alkaline conditions being produced by maintaining magnesium oxide suspended therein.

GEORGE W. SEYMOUR.
VICTOR S. SALVIN.

REFERENCES CITED

The following references are of record in the file of this patent:

UNITED STATES PATENTS

| Number | Name | Date |
|---|---|---|
| 648,261 | Homolka | Apr. 24, 1900 |
| 722,861 | Levinstein | Mar. 17, 1903 |
| 1,836,295 | Thiess | Dec. 15, 1931 |
| 1,902,854 | Herzberg | Mar. 28, 1933 |
| 2,029,351 | Wormald | Feb. 4, 1936 |
| 2,208,678 | Markush | July 23, 1940 |
| 2,221,131 | Fischer | Nov. 12, 1940 |

FOREIGN PATENTS

| Number | Country | Date |
|---|---|---|
| 22,078 | Great Britain | 1902 |
| 152,406 | Germany | June 14, 1904 |
| 481,633 | Great Britain | Mar. 15, 1938 |

OTHER REFERENCES

Beilstein: "Handbuch der Org. Chem.," 4th ed., vol. XIV, page 709.